United States Patent
Bush

(10) Patent No.: US 6,174,149 B1
(45) Date of Patent: Jan. 16, 2001

(54) SCROLL COMPRESSOR WITH CAPTURED COUNTERWEIGHT

(75) Inventor: James W. Bush, Skaneateles, NY (US)

(73) Assignee: Scroll Technologies, Arkadelphia, AR (US)

(*) Notice: Under 35 U.S.C. 154(b), the term of this patent shall be extended for 0 days.

(21) Appl. No.: 09/268,933

(22) Filed: Mar. 16, 1999

(51) Int. Cl.[7] ....................................................... F04C 2/00
(52) U.S. Cl. .................. 418/55.1; 418/151; 417/350; 29/888.022; 310/51; 310/261; 310/157; 74/603; 74/573 R
(58) Field of Search ................................ 418/55.1, 151, 418/55.3; 417/350; 29/888.022; 310/51, 261, 157, 211; 74/603, 573 R, 568 R

(56) References Cited

U.S. PATENT DOCUMENTS

| | | | |
|---|---|---|---|
| 4,889,475 | * | 12/1989 | Gannaway et al. .................. 417/350 |
| 4,992,033 | * | 2/1991 | Caillat et al. ........................ 418/55.3 |
| 5,017,107 | * | 5/1991 | Fraser, Jr. et al. .................. 418/55.5 |
| 5,439,361 | * | 8/1995 | Reynolds et al. ................... 418/55.6 |

FOREIGN PATENT DOCUMENTS

| | | | | |
|---|---|---|---|---|
| 0 623 748 | * | 11/1994 | (EP) | .................................. 418/55.1 |
| 403175185 | * | 7/1991 | (JP) | .................................. 418/55.1 |
| 405288168 | * | 11/1993 | (JP) | .................................. 418/55.1 |

* cited by examiner

*Primary Examiner*—Thomas Denion
(74) *Attorney, Agent, or Firm*—Carlson, Gaskey & Olds

(57) ABSTRACT

A counterweight is attached to a rotating shaft by a slip fit, combined with two axially abutting surfaces to hold the counterweight. The counterweight is preferably held at one face by a ledge formed on the shaft, and at the opposed face by a portion of the motor rotor. Circumferentially spaced abutting surfaces also hold the counterweight to cause the counterweight to rotate with the rotor. The present invention eliminates the need for separately attaching the counterweight to the shaft, and thus reduces both the complexity of assembly, and also the need for precise manufacturing tolerances for the counterweight.

9 Claims, 2 Drawing Sheets

SCROLL COMPRESSOR WITH CAPTURED COUNTERWEIGHT

BACKGROUND OF THE INVENTION

This invention relates to the attachment of a counterweight to a rotating shaft in a way that simplifies the attachment.

Counterweights are often utilized on rotating shafts to balance forces that might be occurring along the shaft as the shaft rotates. As one example, in a scroll compressor, a shaft is driven by an electric motor to drive an orbiting scroll member. The orbiting scroll member is driven to orbit relative to a second scroll member. The counterweight is utilized to balance forces that are created by the orbiting scroll member.

Typically, counterweights have been attached to the shaft by any one of several attachment methods. As an example, the counterweights have been press-fit or shrunk-fit onto the shafts. Further, staking, swaging or other positive attachment methods have been utilized. These methods have required the counterweight to be formed rather precisely, and further have added the additional costs of the individual attachment methods.

It would be desirable to reduce the cost and complexity of attaching the counterweight to the shaft.

SUMMARY OF THE INVENTION

In a disclosed embodiment of this invention, structure is provided on the shaft and on the motor rotor to hold the counterweight. The counterweight is not positively attached to the shaft, but rather is captured.

In a disclosed embodiment of this invention, the counterweight is utilized in a scroll compressor. However, it should be understood that the counterweight attachment structure and method would have application in other rotating devices.

In one embodiment, the shaft is formed with an enlarged ledge that captures a first side of the counterweight. The motor rotor end ring axially captures the other side of the counterweight. The counterweight is preferably formed with an axially enlarged portion which is captured between the ledge and the end cap, and an axially larger portion which provides the counterweight function. The end cap may also be provided with locator lugs which abut both sides of the axially enlarged portion to ensure that the counterweight does rotate with the shaft.

In a preferred embodiment of this invention, the counterweight has a bore with a draft that expands radially outwardly in a direction moving away from the scroll compressor, and toward the motor. This facilitates the attachment of the counterweight to the shaft, and facilitates the holding of the counterweight at a predictable position on the shaft.

In a method according to the present invention, the shaft is formed with a ledge. The counterweight is initially placed on the shaft, and the motor rotor is then placed onto the shaft and secured to the shaft. Various methods for attaching the motor rotor may be utilized. The motor rotor thus captures the counterweight between the shaft ledge and the motor rotor structure.

These and other features of the present invention can be best understood from the following specification and drawings, the following of which is a brief description.

DETAILED DESCRIPTION OF A PREFERRED EMBODIMENT

Figure 1:
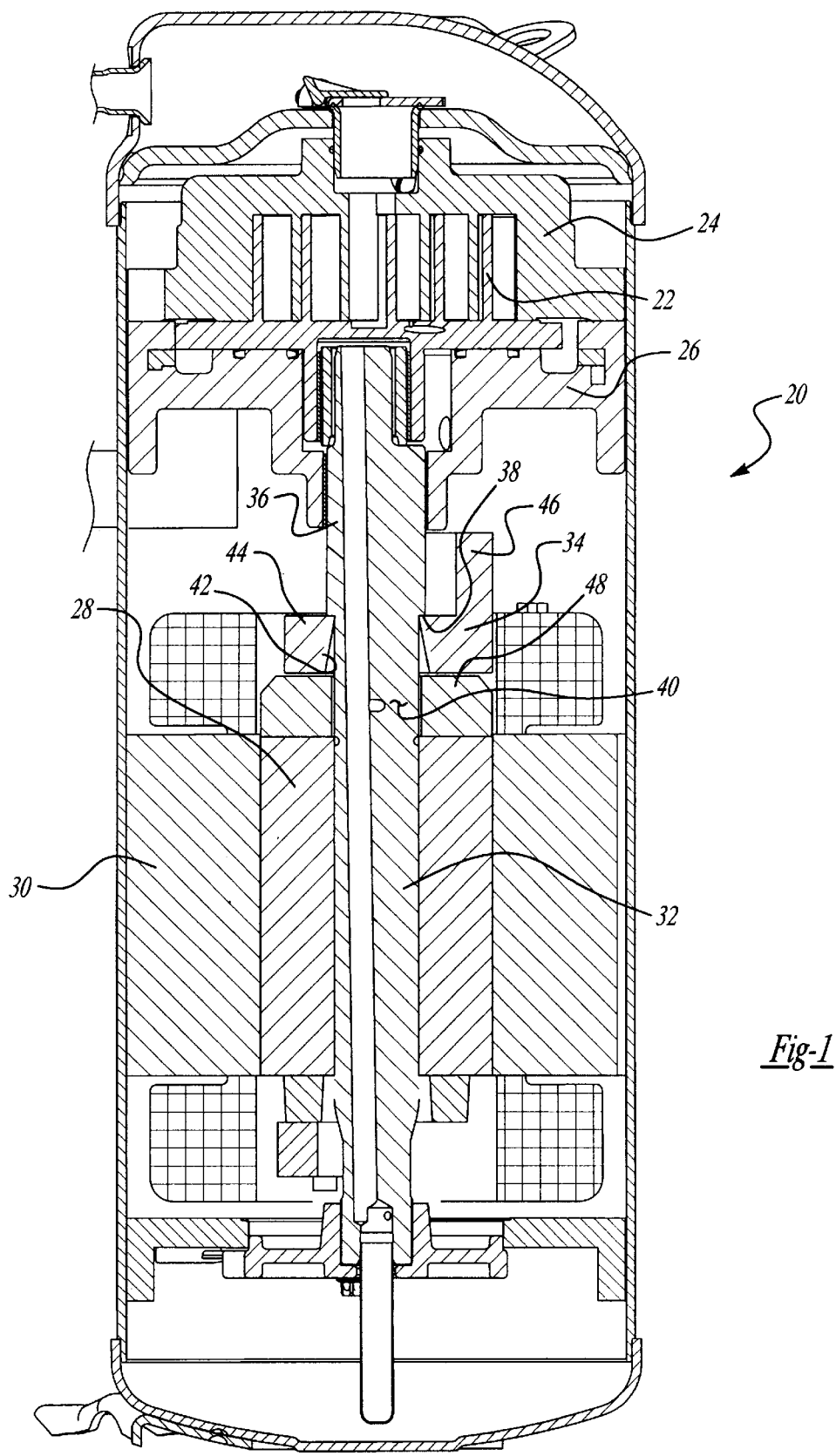
FIG. 1 is a cross-sectional view through a scroll compressor incorporating the present invention.

Scroll compressor 20 is illustrated in FIG. 1 having an orbiting scroll 22 and a second scroll member 24. The orbiting scroll member is driven to orbit relative to the second scroll member 24 by an electric motor, as known. The crankcase 26 supports the orbiting scroll member. The motor includes a motor rotor 28 and a motor stator 30. The motor rotor 28 is secured to a shaft 32 by any known method.

A counterweight 34 is held on the shaft 32, but is preferably not positively secured to the shaft. The shaft 32 has an enlarged portion 36 with a ledge 38 expanding radially outwardly from a radially smaller portion 40. The ledge 38 provides a surface for abutting one face of an axially smaller portion 44 of the counterweight. Bore 42 is sized to be a slip fit along portion 40 of the shaft. The bore 42 has a draft expanding radially outwardly in a direction toward the rotor and away from the ledge 38. The draft facilitates the assembly of the counterweight 34 onto the shaft 32. Further, the draft ensures that the counterweight 34 will easily move upwardly against the ledge 38. Precise machining of the counterweight 34 is thus not necessary. Instead, the counterweight could be made by unfinished casting or powered metal. The part may be thus easily made without regard to precision tolerances.

An enlarged counterweight portion 46 extends axially for a greater distance than the portion 44. Portion 46 performs the bulk of the counterweight function. The end ring 48 of the rotor 28 abuts a face of the counterweight 34 such that the counterweight 34 is captured between the ledge 38 and the end ring 48.

Figure 2:
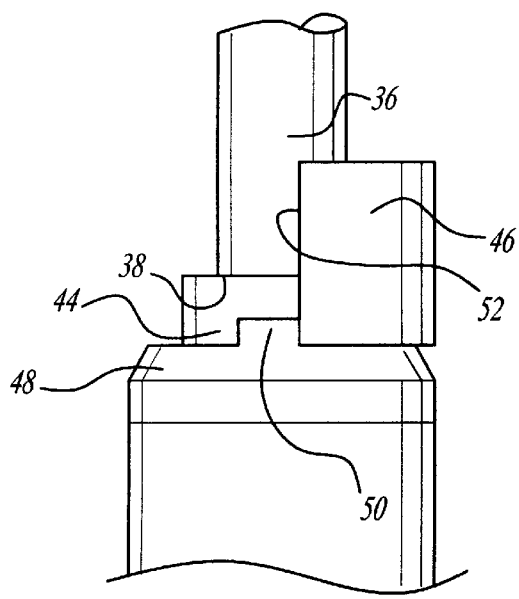
FIG. 2 is an enlarged side view of one portion of the invention shown in FIG. 1.

As shown in FIG. 2, the counterweight's smaller portion 44 is captured between the ledge 38 and the end ring 48. The axially enlarged portion 46 extends axially beyond the ledge 38. Locator lugs 50 are formed extending axially beyond the end ring 48 and abut side surfaces 52 of the axially enlarged portion 46. Thus, when the rotor 48 rotates, the locator lugs 50 will ensure that the counterweight 34 will rotate with the rotor and shaft.

Figure 3:
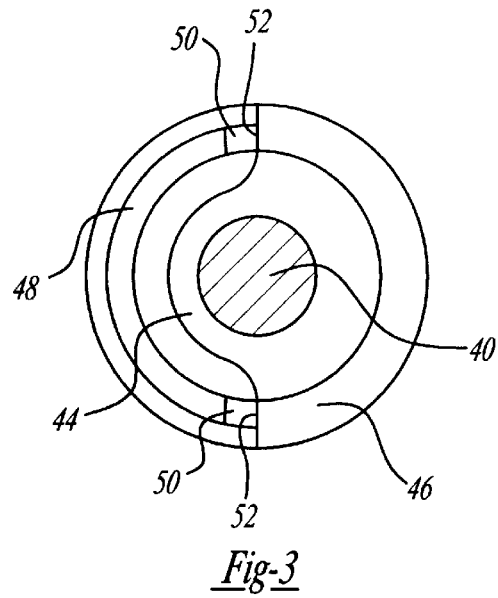
FIG. 3 is a top view of a portion of the invention.

As shown in FIG. 3, the locator lugs 50 are formed at two positions spaced on each side of the sides 52 of the enlarged portion 46. The locator lugs 50 are positioned spaced 180 degrees from each other, although other spacing angles may be utilized depending on the particular design.

Figure 4:
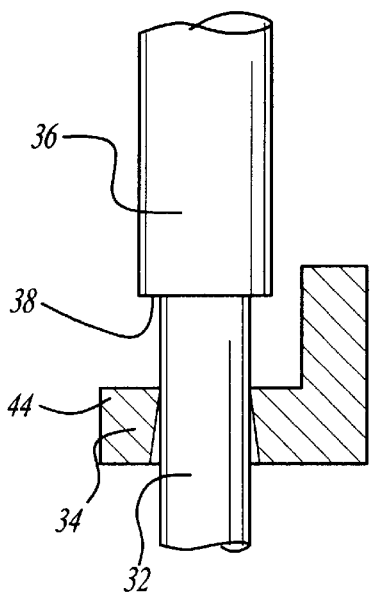
FIG. 4 shows a first assembly step.
Figure 5:
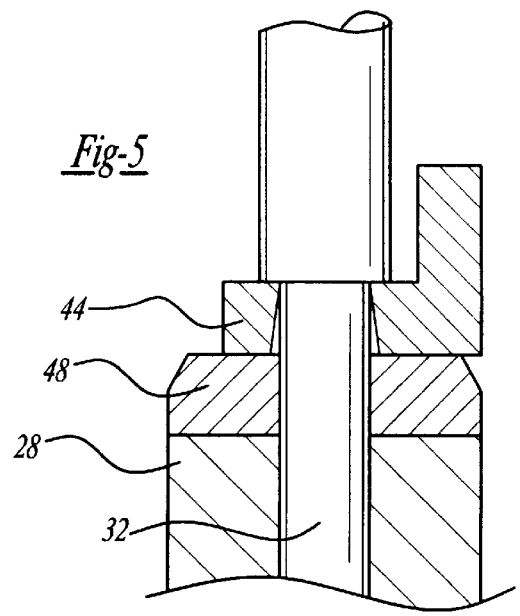
FIG. 5 shows a subsequent assembly step.

FIG. 4 shows a first step in forming the shaft and counterweight of the present invention. The shaft 32 is initially formed, and the counterweight 34 is moved upwardly onto the shaft 32 until an upper face of counterweight portion 44 abuts the ledge 38. As shown in FIG. 5, the rotor 28 is then moved onto the shaft 32, and abuts the underface of the counterweight 44. The rotor may then be secured to the shaft by any known method.

The present invention thus simplifies the assembly of a shaft, counterweight and rotor by eliminating the necessary attachment step for the counterweight. Moreover, by utilizing the inventive method, there are less restrictions and tolerances involved in the manufacture of the counterweight. Thus, the cost and difficulty in forming the counterweight is greatly reduced.

A preferred embodiment has been disclosed, however, a worker in this art would recognize that certain modifications would come within the scope of this invention. For that reason, the following claims should be studied to determine the true scope and content of this invention.

What is claimed is:

1. A scroll compressor comprising:

a first scroll member having a base and a generally spiral wrap extending from said base;

a second scroll member having a base and a generally spiral wrap extending from said base, said first scroll member being attached to be driven by a shaft, and said first scroll member being designed to orbit relative to said second scroll member by being driven by said shaft;

an electric motor including a rotor secured to said shaft; and a counterweight mounted on said shaft, said counterweight being unsecured to said shaft, but axially captured between radially extending surfaces on said rotor and said shaft.

2. A scroll compressor as recited in claim 1, wherein a surface of said rotor abuts one face of said counterweight, and said shaft is formed with a radially enlarged portion and a radially smaller portion, with a ledge being defined between said radially enlarged and radially smaller portions, and said ledge abutting an opposed face of said counterweight to capture said counterweight.

3. A scroll compressor as recited in claim 2, wherein an end ring of said rotor abuts said one face of said counterweight.

4. A scroll compressor as recited in claim 3, wherein at least one locator lug extends axially beyond said end ring, and abuts at least one radially extreme end surface of an axially enlarged portion of said counterweight such that said counterweight is also captured to rotate with said rotor and said shaft.

5. A scroll compressor as recited in claim 4, wherein said counterweight has an axially smaller portion which is captured between said ledge and said end ring, and said axially enlarged portion extending beyond said ledge, said locator lug contacting an extreme circumferential end of said axially enlarged portion to ensure said counterweight rotates with said rotor.

6. A scroll compressor as recited in claim 1, wherein a bore of said counterweight is sized to be a slip fit on said shaft.

7. A scroll compressor as recited in claim 6, wherein said bore expands radially outwardly in a direction from said second scroll member and towards said rotor.

8. A rotating system comprising:

an electric motor having a rotor, said rotor being fixed to a shaft, said shaft being driven to rotate by said rotor; and a counterweight captured between a radially extending portions on said shaft and said rotor, said counterweight having opposed faces abutting both said portion of said rotor and a portion of said shaft.

9. A method of assembling a compressor comprising the steps of:

(1) providing a shaft to be attached to a compressor element, providing a counterweight having a bore allowing said shaft to pass through said bore;

(2) mounting said counterweight on said shaft; and (3) then securing said rotor to said shaft with said counterweight being unsecured to said shaft, but captured between radially extending portions on said shaft and said rotor.

* * * * *